March 19, 1968 F. I. DULLY 3,374,031

SUNSHADE SUPPORT ASSEMBLY

Filed April 25, 1966

INVENTOR.
Floyd I. Dully
BY
Herbert Furman
ATTORNEY

United States Patent Office 3,374,031
Patented Mar. 19, 1968

3,374,031
SUNSHADE SUPPORT ASSEMBLY
Floyd I. Dully, Detroit, Mich., assignor to General Motors Corporation, Detroit, Mich., a corporation of Delaware
Filed Apr. 25, 1966, Ser. No. 544,893
5 Claims. (Cl. 296—97)

This invention relates to sunshade support assemblies and more particularly to vehicle body sunshade support assemblies.

One feature of this invention is that it provides a sunshade support assembly which includes a sunshade support rod and support means for mounting the rod on a vehicle body for movement to various adjusted positions about a plurality of pivotal axes. Another feature of this invention is that the support means maintains the support rod in any adjusted position despite vibration or other movements tending to relocate the support rod relative to the support means. A further feature of this invention is that the support means includes a pair of relatively movable members, one including means for resiliently gripping the support rod, and cooperating cam means on the members operative under a bias force to cause the gripping means to resiliently grip the rod.

These and other features of the support assembly of this invention will be readily apparent from the following specification and drawings wherein.

Figure 1:
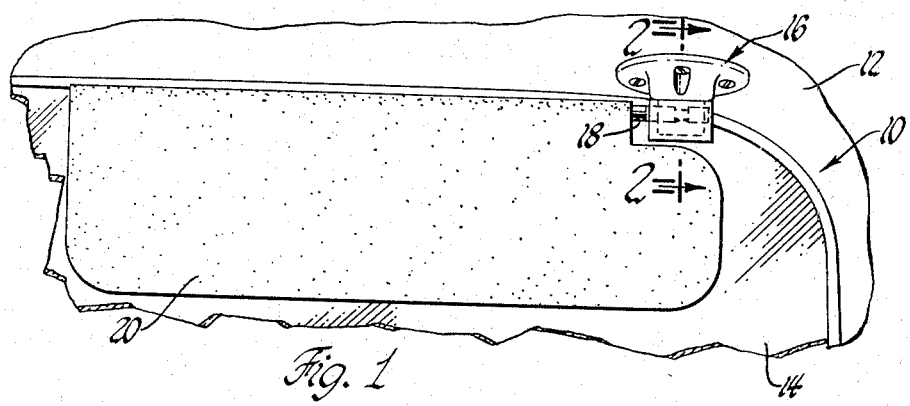
FIGURE 1 is a partial view of a vehicle body embodying a sunshade support assembly according to this invention.

Referring now particularly to FIGURE 1, a vehicle body designated generally 10 includes a body header structure 12 which houses the upper edge portion of the windshield 14. A sunshade support assembly 16 according to this invention is mounted on the header 12 and includes a support rod 18 which supports a sunshade 20. The sunshade 20 is movable to various adjusted positions with respect to the windshield 14 upon rotational movement of the support rod 18 about a generally horizontal axis coincident with that of rod 18 or a generally vertical axis normal to that of the rod.

Figure 2:
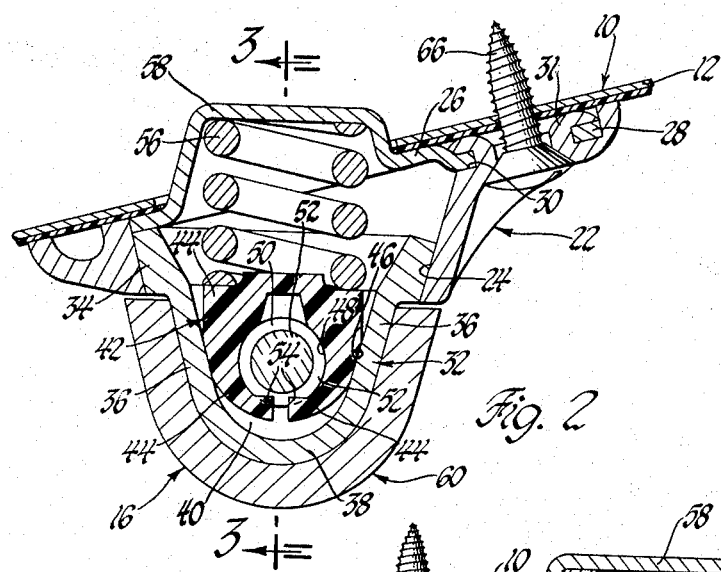
FIGURE 2 is an enlarged sectional view taken generally along the plane indicated by line 2—2 of FIGURE 1.
Figure 4:
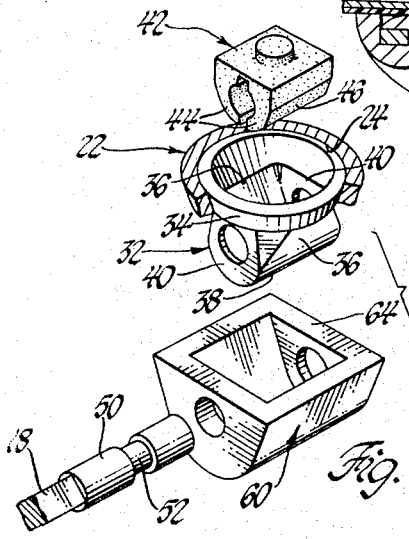
FIGURE 4 is an exploded perspective view.
Figure 3:
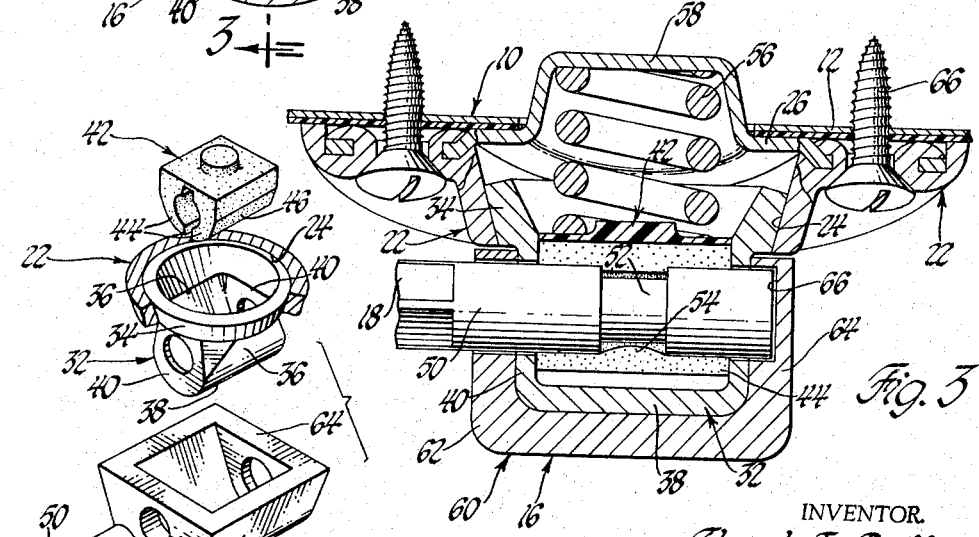
FIGURE 3 is a sectional view taken generally along the plane indicated by line 3—3 of FIGURE 2.

As shown in FIGURES 2 and 3, the assembly 16 includes a support member 22 having a downwardly convergent annular tapered surface or opening. A cover plate 26 fits over the opening 24 and includes a plurality of apertured offset tabs 28 which are received in recesses 30 of member 22. Apertured bosses 31 of member 22 extend through the tabs 28 and are thereafter headed over the tabs to secure the plate 26 to member 22.

A pivot member 32 includes an annular flange 34 having an outer downwardly convergent surface which seats against the surface 24 of member 22 to rotatably mount member 32 on member 22. The member 32 further includes a pair of oppositely tapered downwardly convergent side walls or portions 36 interconnected by a base wall or juncture portion 38. Walls 36 are further interconnected by apertured end walls 40. A retainer member 42 includes a pair of spaced jaws or clamping portions 44. Jaws 44 include cam surfaces 46 which are of slightly less taper than the taper of the inner surfaces of walls 36 and slidably engage the latter. The jaws further include semi-circularly shaped grooves or recesses 48 which open toward each other. The annular end portion 50 of the support rod 18 is received through the apertured walls 40 of member 32 and has the outer surface thereof slidably engageable with the surfaces of the recesses 48. The portion 50 is provided with an annular groove 52 and each of the jaws 44 is provided with a nubbin or node 54 received within the groove 52 to locate the support rod aaginst axial movement relative to the member 42.

A coil compression spring 56 seats between the member 42 and a boss or recess 58 of plate 26 and biases the member 42 downwardly or within the member 32. The engagement of the cam surfaces 46 with the cam surfaces provided by the inner surfaces of walls 36 cams the jaws 44 toward each other and into resilient gripping engagement with the outer surface of the support rod portion 50. Spring 56 also seats flange 34 against the surface 24 of member 22.

The support rod 18 and the sunshade 20 can be rotated about an axis coincident with that of the rod 18 as the end portion 50 of the support rod moves within the recesses 48 of jaws 44. This allows the sunshade to be disposed at various positions with respect to the windshield 14. Likewise the rod 18, the sunshade 20 and the members 32 and 42 can be moved as a unit relative to the support member 22 to rotate the sunshade 20 about an axis located generally normal to that of the rod 18 and again dispose the sunshade at various adjusted positions relative to the windshield 14. The single spring 56 thus supplies the biasing force to adjustably hold the sunshade 20 and suppor rod against movement about a plurality of pivotal axes.

It is intended that the retainer member 42 be formed of a suitable plastic materail to obviate noise problems incident to movement of the end portion 50 of the support rod 18 within the recesses 48.

It should also be noted that the cam surfaces 46 provide an inherent takeup for manufacturing tolerances so that the jaws 44 will always resiliently grip the end portion 50 of the support rod 18 under the action of the spring 56.

A decorative cap 60 is shaped to conform to the outer surface of the member 36 and is secured thereto in any suitable manner. One wall 62 of the cap is provided with an aperture which is located in alignment with the aperture in one end wall 40 of the member 32. The other end wall 64 of the cap is provided with a recess 66 which is located in alignment with the aperture in the other end wall 40 of member 32. The apertures in the walls 40 are of larger size than the diameter of the support rod portion 50 to provide for movement of the support rod and member 42 relative to the member 32 and cap 60.

It should also be noted that the same support assembly can be used for both right- and left-hand installation by merely reversing the cap 60 with respect to the member 32.

The support assembly 16 may be conveniently mounted on the body header 12 by means of a plurality of screws 66 which extend through the bosses 31 and into the material of the header.

Thus this invention provides an improved sunshade support assembly.

I claim:
1. A sunshade support assembly comprising, in combination, support means adapted to be fixedly mounted on a vehicle body, a pair of generally telescopically movable members, means rotatably mounting one of said members on said support means, the other of said members being supported on the one member and including at least a pair of spaced clamping portions movable relative to each other, a sunshade support rod located between said portions and being clamped thereby upon relative movement of said portions, cooperating cam means on said members operative upon telescopic movement of said members relative to each other to move said clamping portions relative to each other and into clamping engagement with said support rod, and resilient means biasing said members relative to each other.

2. The combination recited in claim 1 wherein said cam means include a pair of cam surfaces on said one member and a pair of respective cam surfaces on said clamping portions engageable with said first cam surfaces under the action of said resilient means to cam said portions toward each other and into engagement with said support rod.

3. The combination recited in claim 2 wherein said first cam surfaces are tapered convergently of each other and said second cam surfaces are of dissimilar convergent taper than said first surfaces.

4. The combination recited in claim 1 wherein said support means includes a tapered annular portion, said one member including a tapered annular portion received within said support means tapered portion in the telescopic relationship therewith, said resilient means seating said annularly tapered portions in engagement with each other to axially locate said one member relative to said support means and rotatably mount said one member thereon.

5. The combination recited in claim 1 wherein said support means includes a convergently tapered annular portion, said one member includes a convergently tapered annular portion respective to said support means portion and rotatably seated thereagainst, said cam means including a pair of convergently tapered walls on said one member and a pair of respective cam surfaces on said clamping portions of dissimilar taper, said resilient means seating between said support means and said other member to seat said annularly tapered portions with respect to each other and bias said other member within said convergent walls to cause said cam surfaces on said clamping portions to move said clamping portions toward each other and into resilient gripping engagement with said support rod.

References Cited

UNITED STATES PATENTS 2,454,613  11/1948  Peltier et al. _____ 296—97

FOREIGN PATENTS 1,028,717  2/1953  France.

LEO FRIAGLIA, *Primary Examiner.*

J. A. PEKAR, *Assistant Examiner.*